US010922810B2

(12) United States Patent
Dudzik et al.

(10) Patent No.: US 10,922,810 B2
(45) Date of Patent: Feb. 16, 2021

(54) AUTOMATED VISUAL INSPECTION FOR VISIBLE PARTICULATE MATTER IN EMPTY FLEXIBLE CONTAINERS

(71) Applicants: Baxter International Inc., Deerfield, IL (US); Baxter Healthcare S.A., Glattpark (CH)

(72) Inventors: Frank Dudzik, Woodstock, IL (US); William Hurst, Burlington, WI (US); Neal Zupec, Spring Grove, IL (US)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 6 days.

(21) Appl. No.: 16/111,897

(22) Filed: Aug. 24, 2018

(65) Prior Publication Data

US 2019/0066288 A1 Feb. 28, 2019

Related U.S. Application Data

(60) Provisional application No. 62/550,313, filed on Aug. 25, 2017.

(51) Int. Cl.
*G06T 7/00* (2017.01)
*H04N 5/225* (2006.01)
(Continued)

(52) U.S. Cl.
CPC .......... *G06T 7/001* (2013.01); *G01N 21/8851* (2013.01); *G01N 21/9018* (2013.01);
(Continued)

(58) Field of Classification Search
CPC ........... G06T 7/001; G06T 7/136; G06T 7/13; G06T 2207/10024; G06T 2207/20224;
(Continued)

(56) References Cited

U.S. PATENT DOCUMENTS

| 5,940,176 A | 8/1999 | Knapp |
| 2003/0012421 A1* | 1/2003 | Werzinger ......... G01N 21/8851 382/142 |

(Continued)

FOREIGN PATENT DOCUMENTS

| DE | 41 23 173 A1 | 1/1992 |
| EP | 1 176 417 A1 | 1/2002 |

(Continued)

OTHER PUBLICATIONS

International Search Report and Written Opinion dated Nov. 23, 2018 in related PCT Application No. PCT/US2018/047927 (15 Pages).

*Primary Examiner* — Hee-Yong Kim
(74) *Attorney, Agent, or Firm* — K&L Gates LLP

(57) ABSTRACT

An automated visual inspection system for detecting the presence of particulate matter includes an empty, flexible container, a light source, a detector, and an image processor. The light source is configured to transmit light through the container towards the detector, and the detector is configured to receive the light and generate image data. The image processor is configured to analyze the image data, determine whether the empty, flexible container is defective, and generate a rejection signal if the empty, flexible container is defective.

18 Claims, 5 Drawing Sheets

(51) Int. Cl.
*G06T 7/136* (2017.01)
*G01N 21/90* (2006.01)
*G01N 21/88* (2006.01)
*G06T 7/13* (2017.01)
*G06T 7/60* (2017.01)

(52) U.S. Cl.
CPC ......... *G01N 21/9081* (2013.01); *G06T 7/136* (2017.01); *H04N 5/2256* (2013.01); *G06T 7/13* (2017.01); *G06T 7/60* (2013.01); *G06T 2207/10024* (2013.01); *G06T 2207/20081* (2013.01); *G06T 2207/20216* (2013.01); *G06T 2207/20224* (2013.01)

(58) Field of Classification Search
CPC ........ G06T 2207/20216; H04N 5/2256; G01N 21/9018; G01N 21/8851
USPC .......................................................... 348/92
See application file for complete search history.

(56) References Cited

U.S. PATENT DOCUMENTS

| | | | | |
|---|---|---|---|---|
| 2014/0119634 | A1* | 5/2014 | Numazu | G06T 7/001 |
| | | | | 382/142 |
| 2018/0300865 | A1* | 10/2018 | Weiss | G06T 7/001 |
| 2019/0263146 | A1* | 8/2019 | Sharp | F16D 27/01 |

FOREIGN PATENT DOCUMENTS

| | | | |
|---|---|---|---|
| JP | 2013 164362 A | | 8/2013 |
| JP | 2013164362 | * | 8/2013 |
| JP | 2014 224807 A | | 12/2014 |
| JP | 2014224807 | * | 12/2014 |
| WO | WO 2015/000350 A1 | | 1/2015 |

* cited by examiner

AUTOMATED VISUAL INSPECTION FOR VISIBLE PARTICULATE MATTER IN EMPTY FLEXIBLE CONTAINERS

RELATED APPLICATIONS

This application claims the benefit of and priority to U.S. Provisional Patent Application No. 62/550,313 filed Aug. 25, 2017, entitled "AUTOMATED VISUAL INSPECTION FOR VISIBLE PARTICULATE MATTER IN EMPTY FLEXIBLE CONTAINERS," which is incorporated herein by reference in its entirety.

BACKGROUND

Solution containers, such as flexible containers, are often manufactured on high-speed production lines, which typically include a series of stations in which the containers are made and/or modified. To meet customer demand and achieve a high output, the manufacturing steps or stations are often accomplished at the highest possible speed. Due to the large overall output and environmental factors, a small proportion of the flexible solution containers may exhibit defects.

Flexible solution containers (e.g., IV fluid bags or dialysis fluid bags) may be defective because of inclusions of visible particulate matter. Particulate matter inside flexible solution containers may be generated from rubbing, cutting, tough transfer, etc. For example, particulate matter may include lint or fibers, metal, rubber, excess product materials from the manufacturing process, foreign particles, etc.

Unfortunately, existing methods for identifying flexible container defects are often inadequate. For example, human inspection systems require physical interactions with the container closure system, which may negatively influence product quality. Additionally, manual human visual inspection may be inefficient for a number of reasons. For one reason, it is time consuming to inspect each and every unit of product that comes off a high-speed production line. For another reason, manual human visible inspection can be ineffective, with certain data showing only 70 percent probability of detection.

An improved inspection system and method for empty, flexible containers is needed accordingly.

SUMMARY

The present disclosure provides improved automated visual inspection systems and methods for empty flexible containers. An automated visual inspection system may detect the presence of particulate matter in an empty container. For example, by using image data from images taken of the container illuminated by a light source and optionally positioned in front of a backdrop, particulate matter may be detected and identified. After particulate matter is identified, the defective container may be removed from the production line.

In an example embodiment, an automated visual inspection system for detecting the presence of particulate matter in an empty, flexible container includes a light source, a detector, and an image processor. The light source is configured to transmit light and the detector is configured to receive the light and generate image data. Additionally, the system may include a backdrop and a conveyor system to transport the container along a path that passes between the detector and the backdrop, so that light passes through the container and impinges on the backdrop. The image processor is configured to analyze the image data, determine whether the container is defective, and generate a rejection signal if the container is defective.

In another example embodiment, a method includes transmitting, by a light source, light towards an empty, flexible container positioned in front of a backdrop. The method also includes receiving, by a detector, the light transmitted through or reflected from at least one of the empty, flexible container and the backdrop. Additionally, the method includes generating, by the detector, image data from the light received by the detector and analyzing, by an image processor, the image data. Furthermore, the method includes determining, by the image processor, whether the empty, flexible container is defective.

In another example embodiment, a method includes transmitting, by a light source, light towards an empty, flexible container. The method also includes receiving, by a detector, at least one of the light transmitted through or around the empty, flexible container and generating, by the detector, image data from the light received by the detector. Additionally, the method includes analyzing, by an image processor, the image data and determining, by the image processor, whether the empty, flexible container is defective.

In another example embodiment, a method includes transmitting light towards an empty, flexible container; receiving the light transmitted through the empty, flexible container and/or reflected from the backdrop; generating image data from the light received; analyzing the image data; and determining whether the empty, flexible container is defective.

In another example embodiment, a method includes transmitting light towards an empty, flexible container; receiving the light transmitted through and/or around the empty, flexible container; generating image data from the light received; analyzing the image data; and determining whether the empty, flexible container is defective.

It is accordingly an advantage of the present disclosure to reduce the amount of time needed to inspect an empty, flexible container.

It is another advantage of the present disclosure to improve particulate matter detectability and increase particulate matter detection sensitivity in containers.

It is a further advantage of the present disclosure to reduce and prevent container deformation and container damage during inspection.

It is yet another advantage of the present disclosure to reduce waste and cost associated with defective containers.

It is yet a further advantage of the present disclosure to reduce the occurrence of product recalls and serious adverse events due to particulate matter in containers.

It is still another advantage of the present disclosure to provide an inspection system and method with reduced variations due to environmental conditions and human factors.

Additional features and advantages of the disclosed inspection system are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for

DETAILED DESCRIPTION OF EXAMPLE EMBODIMENTS

As discussed above, automated visual inspection systems and methods for empty flexible containers are provided to improve the probability and/or reliability of detecting visible particulate matter in empty flexible containers. Defects, such as the presence of visible particulate matter, are problematic when undetected because they increase costs associated with product recalls and may require additional detection checkpoints (e.g., after filling). The automated visual inspection systems and methods discussed herein improve visible particulate matter detectability in empty flexible containers by increasing the speed and sensitivity of detection, without negatively influencing product quality, and with reduced variation due to environmental and human factors.

One challenge with manual inspection of visible particulate matter is the inability to objectively measure the occurrence of a defect. For example, manual visual inspection relies on manual, often unaided human inspection, which includes operator variation (e.g., within a single operator and between operators). Crosschecking between operators may be implemented to improve uniformity, but variation may still exist. Manual inspection limitations result in a lack of knowledge regarding the true particle load in the manufacturing process, reduced product performance due to higher defect rates than desired, and a difficulty in demonstrating the State of Control of the manufacturing process (i.e., differentiating when the manufacturing process is stable and no corrective action is needed). Additionally, the lack of knowledge regarding the true particle load hinders improvement efforts.

In the system and method of the present disclosure, empty, flexible containers are inspected automatically prior to printing and filling. An inspection station is configured such that the containers are illuminated using a light source. An image sensor is used to capture images of the containers against a background as they pass in front of the light source. The images are automatically analyzed and processed to assess the presence of particulate matter in the flexible containers. When particulate matter is detected, or the levels of particulate matter in the flexible container exceed normal or preset levels, a signal is sent to a reject station and the container is manually or automatically diverted from the process.

Figure 1A:
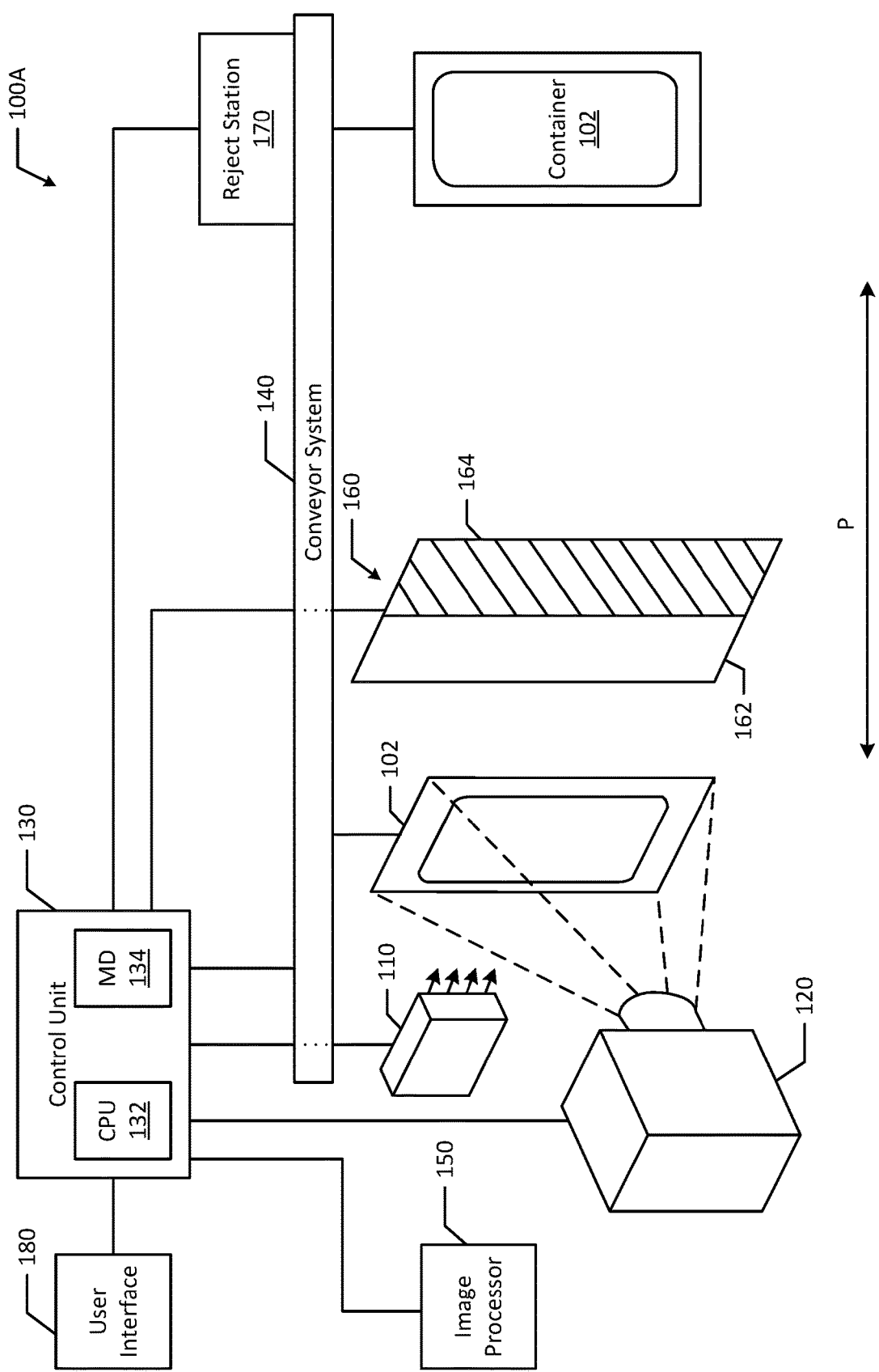
FIG. 1A is a schematic view of an automated visual inspection system according to an example embodiment of the present disclosure.
Figure 1B:
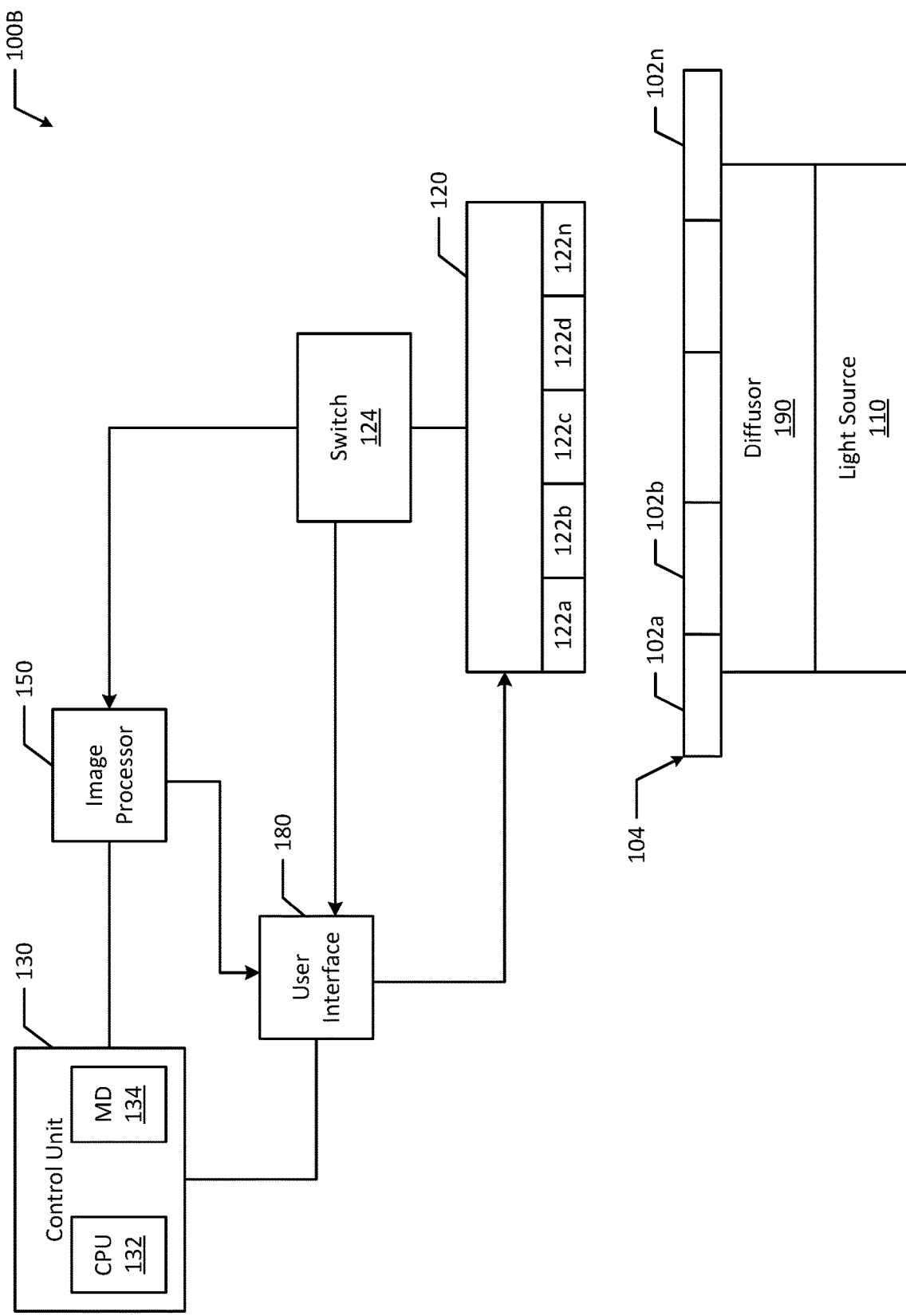
FIG. 1B is a schematic view of an automated visual inspection system according to an example embodiment of the present disclosure.

Referring to the drawings and in particular to FIGS. 1A and 1B, automated visual inspection system(s) 100A and 100B (hereinafter referred to generally as visual inspection system 100) of the present disclosure are provided to inspect empty, flexible containers 102 or a pattern 104 of empty, flexible containers 102. Referring to FIG. 1A, in one embodiment, an automated visual inspection system 100A of the present disclosure is provided to inspect empty, flexible containers 102. In one embodiment, the automated visual inspection system 100A includes a light source 110, a detector 120 (e.g., camera), a control unit 130, a conveyor system 140, an image processor 150, a background or backdrop 160, and a reject station 170. Control unit 130 may include one or more processor(s) (e.g., central processing unit "CPU" 132) and one or more memory (e.g., memory device 134). Control unit 130 in the illustrated embodiment controls only one or more or all of user interface 180, detector 120, conveyor system 140, image processor 150, and rejection station 170. Control unit 130 may receive data and/or signals and send command data to any of those structures.

As used herein, the term, "processor" may refer to a device capable of executing instructions encoding arithmetic, logical, and/or I/O operations. As used herein, the term, "memory" may refer to a volatile or non-volatile memory device, such as random access memory ("RAM"), read-only memory ("ROM"), electrically erasable programmable read-only memory ("EEPROM"), or any other device capable of storing data.

Detector 120 may be a high-resolution camera or camera array, such as a digital camera, video camera, or a magnifier. Additionally, detector 120 may be an array detector, such as a focal plane array camera, a charged-coupled ("CCD") array detector, a complimentary metal-oxide-semiconductor ("CMOS") array detector, photodiode array camera, a spectrometer having a two-dimensional array detector, or any other suitable detector and associated circuitry. The detector 120 may include multiple sensors or cameras 122 (e.g., 122a-n) in an array (as illustrated in FIG. 1B). The array of cameras 122 or detectors 120 may be positioned in a single row as a linear array or in a stacked arrangement with multiple rows of cameras 122. In an example configuration, each camera 122 may have a field of view of approximately 140×190 mm and each camera's 122 field of view may overlap approximately 5 mm to 10 mm. Additionally, detector 120 may be positioned approximately 700 mm from the empty, flexible containers 102. In an example, each camera 122 in the array may include secure pins to maintain lens focus settings.

In an example, detector 120 and/or image processor 150 may "take" one or more images of container 102. Additionally, automated visual inspection system 100 may include more than one detector 120 where each detector is adapted to capture different images. For example, a combination of different detectors 120 may be used (e.g., different detectors 120 may capture images in different light spectrums). In another example, one detector 120 may be positioned to capture images of container 102 against backdrop 160, while another detector 120 may be positioned behind container 102 to capture images of light passing through the container 102 before the light reaches backdrop 160.

As illustrated in FIG. 1A, empty container 102 is transported by conveyor system 140 along a path P between detector 120 and background or backdrop 160, so that light from light source 110 illuminates container 102 against background or backdrop 160 and impinges detector 120. As used herein, the term, "container" may refer to a flexible container or bag made from polyvinylchloride ("PVC"), flexible polypropylene, poly(ethylene-co-vinyl acetate)

("EVA"), and other flexible, sterilizable materials. It should be appreciated that other empty bags and containers may also be analyzed using automated visual inspection system 100A.

The detector 120, such as a camera or camera array, may be positioned opposite of backdrop 160, but on the same side as light source 110, with empty container 102 passing between detector 120/light source 110 and backdrop 160. In another example, detector 120 may be positioned opposite light source 110, with empty container 102 passing between detector 120 and light source 110. Detector 120 may employ increased sensitivity enabling the automated visual inspection system 100 to detect small defects (e.g., particulate matter) in empty, flexible containers 102.

In an example embodiment, light source 110 may emit light at a desired wavelength. For example, the light source 110 (e.g., LEDs) may be tuned to the visual spectrum of light. In another example embodiment, filters may be used with light source 110 to tune the light source 110 to an appropriate wavelength to improve detection of specific particles. For example, light source 110 may be filtered to improve detectability of defects, such as particulate matter including metal fragments, rubber, or fiber-like material resulting from the manufacturing process. Additionally, particulate matter may include any other foreign material, such as dust, pollen, insects, etc.

Control unit 130 may be programmed to store multiple selectable programs to cause container 102 to be transported along the conveyor path P at a desired speed, such that detector 120 receives a sufficient amount of the light passing through or reflecting off the container 102 to generate image data. Control unit 130 in the illustrated embodiment operates with user interface 180 to program and/or select a control program at control unit 130. For example, a user may use user interface 180 (e.g., via touchscreen and/or membrane switch) to program or select a program of operating conditions for the automated visual inspection system 100 (e.g., specifying any one or more of conveyor speed, light intensity, rejection requirements or parameters, background contrast, bag agitation, etc.). User interface 180 may also include a display screen that displays operating parameters of automated visual inspection system 100 and a touch screen and/or membrane switches for user inputs.

The user interface 180 may be a human-machine interface that serves as an interface between image collection/analysis and the user or operator. In an example, user interface 180 may display a "pass" indication, such as a message that reads "PASS" or may display a green light to indicate that the empty, flexible container 102 passed inspection. Similarly, user interface 180 may display a "reject" indication, such as a message that reads "REJECT" or "EJECT" or may display a red light to indicate to the user or operator that the empty, flexible container 102 failed inspection. Various indications (e.g., messages, lights, sounds, alerts) may be used to indicate to the user or operator what action to take with the inspected item. User interface 180 may also maintain information such as logged operator, lot under production, container code, last inspection result, status, cycle count, etc.

In various embodiments, conveyor system 140 may be electromechanically driven using a conveyor belt, linked chain, rack and pinion, wheel/bearing track, or other drive mechanism to move containers 102 along conveyor system 140. Conveyor system 140 may for example include a continuous linked chain that creates a path between background or backdrop 160 and detector 120. Additionally, conveyor system 140 may communicate with reject station 170, such that upon receiving a rejection signal, the defective empty container 102 can be appropriately diverted to a rejection bin or re-routed to a secondary line for removing particulate matter. For example, after particulate matter is removed, the container 102 may be re-routed through the automated visual inspection system 100.

Image processor 150 may be a server (e.g., a remote server) configured to perform image processing and image inspection. For example, image processor 150 may implement processing and/or inspection applications, algorithms, functions, or the like to analyze image data received from detector 120. Image processor 150 and/or detector 120 may be configurable by a user, for example, by setting various parameters. The parameters may include, but are not limited to, threshold size of particulate matter 320, container geometry and variability, etc. For example, a parameter may be set or adjusted for a particular threshold particle size. Additionally, a threshold particle size may be established for each zone or region of interest or each type of container (e.g., different types of containers may have different detection threshold set). In another example, an inspection parameter governing container geometry or variability may be established to set the sensitivity to port tube length, container seal variation, tubing translucence (e.g., frosting levels), etc. Additionally, adjustments may be made to detect angled port tubes, missing parts, dimensional tolerances, etc.

In an example, image data from detector 120 may be sent to the image processor 150 or server via an Ethernet switch (not pictured in FIG. 1A). The image processor 150 or server may be a high-speed server that receives information via fiber optic cable transmission. Once image data is processed and images are generated or built for inspection, the automated visual inspection system 100 may make decisions based on the image data or images. The image data from detector 120 may be sent to the image processor 150 for analysis and then transmitted back to user interface 180 for display and/or decisions.

Referring to FIG. 1B, in one embodiment, an automated visual inspection system 100B of the present disclosure is provided to inspect a pattern 104 empty, flexible containers 102 (e.g., containers 102a-n). All of or a portion of automated visual inspection system 100B may be arranged within a housing or cabinet. In one embodiment, the automated visual inspection system 100B includes a light source 110, a diffusor 190, a detector 120 (e.g., a camera array), an image processor 150, and a user interface 180. Control unit 130 in the illustrated embodiment controls only one or more or all of user interface 180, detector 120, and image processor 150. Control unit 130 may receive data and/or signals and send command data to any of those structures. Additionally, the automated visual inspection system 100B may include a reject station (not pictured).

As illustrated in FIG. 1B, detector 120 (e.g., array of cameras 122a-n) is positioned above the pattern 104 of empty, flexible containers 102 (e.g., containers 102a-n). For example, detector 120 may be positioned at a distance of approximately 700 mm from the empty, flexible containers 102. Light from light source 110 shines through diffusor 190 and passes through (and around) the empty, flexible containers 102 that rest on diffusor plate 190. The detector 120 receives the light that passes through (and around) the empty, flexible containers and collects image data (e.g., one or more inspection images). Each of the cameras may collect or capture a portion of the pattern 104 and/or container 102 and an image of the entire pattern 104 and/or container 102 may be recreated with aggregate image data (e.g., image data from one or more cameras 122a-n). For example, each sensor or camera 122*a-n* in the array may collect image data of a portion of the pattern 104 of empty, flexible containers 102.

Then, detector 120 sends the image data to image processor 150 (e.g., an inspection server) for analysis, for example, through a high-speed Ethernet switch 124 to a high-speed server, such as image processor 150 via fiber optic cable transmission. As image data is sent to image processor 150, an image of pattern 104 of empty, flexible containers 102 may be reconstructed based on the position or arrangement of each camera 122 relative to a specific container 102 in pattern 104. In other words, camera 122*a* may record image data from a portion (e.g., top half) of container 102*a* and camera 122*b* may record image data from a different portion (e.g., bottom half) of container 102*a*. The image data from camera 122*a* and 122*b* may be combined to generate a complete image of container 102*a*.

By differentiating image data (e.g., designating image data on a per container basis or generating an image for each container) within pattern 104, the automated visual inspection system 100 advantageously allows a decision on a "by container" basis instead of a "by pattern" basis to reduce waste and thereby allowing an operator to reject specific containers 102 instead of an entire batch (e.g., multiple containers 102) or pattern 104 of empty, flexible containers 102.

To facilitate the detection of particulate matter 320, each empty, flexible container may be divided into zones or regions of interest. For example, one zone or region of interest may be an area of the empty, flexible container 102 that includes a port tube. Another zone or region of interest may be the main container interior 304 (see FIG. 3A). Additionally, a zone or region of interest may be identified for areas with a seal, such as peripheral seal 306 (see FIG. 3A). Since portions or regions of each container 102 (e.g., port tube, peripheral seal, container interior) have different features and geometry, these regions of interest may be associated with different parameters used by image processor 140. Similarly, some portions of a container 102 may be formed from two layers of film (e.g., Polyvinyl Chloride "PVC" film), other portions are formed from tubing (e.g., PVC tubing). For example, different inspection parameters, and some portions may be formed from both film and tubing. To account for the differences of each region of interest, inspection applications, algorithms, functions, or the like may be used for each region of interest. Using inspection zones or regions of interest advantageously allows the automated visual inspection system 100 to account for the inherent variation in the container 102 design(s) and manufacturing process when detecting particulate matter 320 within a container 102.

Figure 3A:
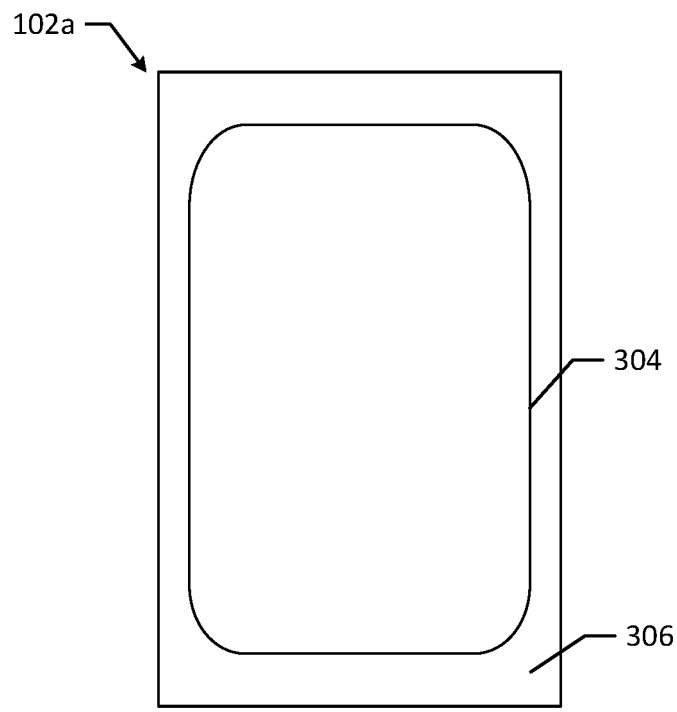
FIGS. 3A and 3B are front elevation views of an empty container according to an example embodiment of the present disclosure.
Figure 3B:
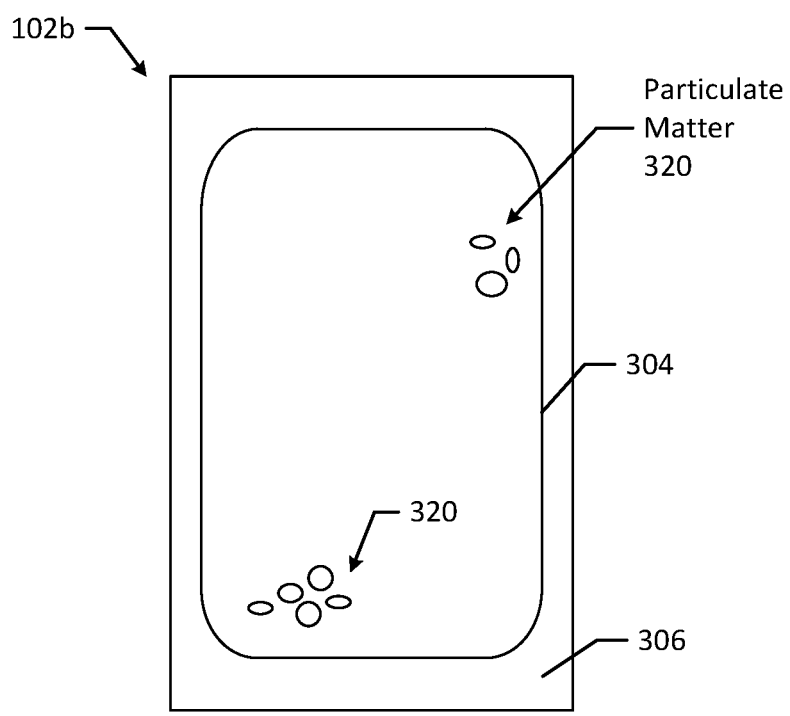

Container 102 includes an interior 304 surrounded by a peripheral seal 306. FIG. 3A illustrates a container 102*a* without a defect (e.g., no particulate matter 320 is present in container interior 304). Conversely, FIG. 3B illustrates a container 102*b* with a defect (e.g., particulate matter 320 is present in container interior 304).

Then, information regarding the analysis is sent to user interface 180 (e.g., human-machine interface) where the user interface generates a display or indication to the user or operator. Based on the information displayed, the operator may make a decision regarding the analysis (e.g., eject a portion of the pattern 104) or continue inspecting empty, flexible containers 102. Additionally, the operator may adjust system parameters (e.g., lighting, detector settings, inspection speed) based on information received from the detector 120, image processor 150, and/or user interface 180.

The diffusor 190 is configured to enhance the image collection for the detector 120. As discussed above, the detector 120 may include multiple sensors or cameras 122 (e.g., 122*a-n*) arranged in an array. The diffusor 190 or plate may be made from a translucent composite polymer, glass, or the like and may be adapted to allow light from light source 100 to pass through to the pattern 104 of empty, flexible containers 102. Diffusor 190 may disperse light from light source 110 such that light is directed towards detector 120 (e.g., array of cameras 122*a-n*) at multiple angles.

As illustrated in FIG. 1B, light source 110 may be a light emitting diode ("LED") arrangement. For example, LEDs may be arranged in rows or strips to allow for ease or replacement or changes to the light source 110. Light source 110 may emit light at a desired wavelength. For example, the light source 110 (e.g., LEDs) may be tuned to the visual spectrum of light. In other implementations, light source 110 may emit light at other visual spectrums or wavelengths.

Light source 110 and/or diffusor 190 may enhance the system 100 capabilities to determine container position, container shape, and whether any particulate matter 320 or obstruction is present within the empty, flexible container 120 or a port of the empty, flexible container 120.

Detector 120 may be a high-resolution camera or camera array, as discussed above with reference to FIG. 1A. For example, detector 120 may include an array of cameras 122*a-n*. In an example arrangement, each camera 122 may have a field of view of approximately 140×190 mm and each camera's 122 field of view may overlap approximately 5 mm to 10 mm. As discussed above, image processor 150 may be a server (e.g., a remote server) configured to perform image processing and image inspection. In an example, image data from detector 120 may be sent to the image processor 150 or server via a switch 124, such as an Ethernet switch. The image processor 150 or server may be a high-speed server that receives information via fiber optic cable transmission. The Ethernet switch 124 and fiber optic cable transmission advantageously ensures that the cycle time of the visual inspection system 100 is low. For example, a high-speed Ethernet switch and fiber optic cable ensures that data is transmitted from the detector 120 to image processor 150 and back to user interface 180 at high speeds.

To reduce variation within the visual inspection system 100, light source 110 and/or detector 120 may be closely controlled. For example, light source 110 may be fine-tuned (e.g., through the use of a filter or diffusor 190) to emit light at a specific wavelength. Additionally, the temperature of detector 120 may be monitored and controlled. For example, the visual inspection system 100 may include sensors to measure the temperature and/or light intensity of detector 120 to monitor and ensure proper detector 120 function. In an example, a functional check may be performed on the visual inspection system 100 without any containers 102 present in the light path. Additionally, a functional check may be performed with empty, flexible containers 102 positioned within the light path between the light source 110 and the detector 120.

Construction of visual inspection system 100 may vary based on the inspection environment. For example, visual inspection system 100 may be implemented in a clean room environment and the various components of the visual inspection system 100 may be made from stainless steel where appropriate and by sealing electrical components with thermoplastic gaskets or the like. Additionally, heat displacement and moisture control for the system 100 may be accomplished with passive cooling to minimize airflow disruption in the surrounding area (e.g., the manufacturing floor). In other environments (e.g., non solution contact rooms), anodized aluminum may be substituted in place of stainless steel.

Visual inspection system 100 may be configured by "training" detector 120 and/or image processor 150 to find visible particulate matter present in empty flexible containers 102. The probability and reliability of detecting the potential particulate matter is thought to be increased as compared to other inspection methods currently used across the industry (e.g., manual visual inspection or automated visual inspection filled containers). For example, the ability to detect particles in empty containers is greater than in filled containers. In filled containers, particle movement, printing on the bag that could block view of the solution, optical lens effect of the filled bag, and cloudiness of the film post sterilization (i.e., blush) may all pose problems and reduce the reliability of detecting particulate matter or defects in containers 102. Detecting defects, such as particulate matter prior to filling, advantageously minimizes the risk of a product with particulate matter making it to a patient, thereby reducing the likelihood of any serious adverse events that may be caused by the particulate matter in solution.

To achieve comparable results of the automated visual inspection of the present disclosure, it is believed that 300 percent or more of standard manual inspection by operators is needed. Automated inspection of filled bags is another alternative, but as described above, there are several disadvantages when inspecting filled bags. Additionally, inspecting filled bags may increase waste, as particulate matter may contaminate the contents of the filled bag, causing both the bag and bag solution to be scrapped.

Conversely, the automated visual inspection system 100 of the present disclosure advantageously detects defects, such as particulate matter, in empty flexible containers 102 (e.g., bags), which provides several cost savings downstream. For example, defects are detected, in one embodiment, before the bags are printed or filled with solution, thereby saving printing and filling costs associated with further manufacturing and processing defective bags. Additionally, by detecting particulate matter early in the manufacturing line, defective containers 102 may be re-routed and cleaned before re-entering the production line. Further, automated visual inspection system 100 may be optimized to increase sensitivity to detect particulate matter that is smaller than current manual human visual inspection capabilities. For example, particles may distribute themselves across different size ranges depending on the mechanism of generation (e.g. rubbing, cutting, tough transfer, etc.). By improving and increasing sensitivity, automated visual inspection system 100 may advantageously identify defects early in the production line, without being limited to the particle size that is seen by humans. Early detection advantageously saves costs and increases the likelihood of determining the source of the defect. Additionally, the benefits of the present disclosure lead to fewer defective parts (e.g., bags) being moved downstream to filling and/or to customers, resulting in fewer recalls and customer complaints. Detection/removal control of empty containers 102 is effective because the majority of particles found in a filled container are already present in empty container 102 prior to filling.

Manual (human) visual inspection ("MVI") is commonly graded at 70 percent probability of detection, but by measuring the same particles with an automated visual inspection system 100, the reliability is believed to improve to approximately 90 percent or more. Additionally, observed false rejection rates are thought to be less than 1 percent using the automated visual inspection system 100 of the present disclosure. Another advantage of the present disclosure is eliminating the effects of fatigue and distraction present in the manual (human) visual inspection process. The improved reliability allows for quick reactions to changes in the process because detection is almost immediate (after bag fabrication instead of after printing or filling), which enables more focus and more accurate corrective/preventive evidence to improve any manufacturing line problem. Further, due to the quickness and reliability of the automated visual inspection system 100, the inspection process is advantageously capable of functioning at a standard line speed, thereby improving manufacturing efficiency.

As used herein, a visible particle or visible particulate matter may be defined by the United States Pharmacopoeia ("USP") Chapter 790. Additionally, USP Chapter 1790, which aims at controlling particles (>50 µm), and also comprises indications for other defects like cracks in primary containers or poorly fitting stoppers, provides additional considerations to optimizing automated visual inspection system 100. For example, Chapter 4 discusses possible particle sources (stopper, glass, silicon etc.) as well as preventing generation of particles.

To train the detector 120 and/or image processor 150, a threshold visible particle size may be determined. The threshold size may depend upon current performance of manual visual inspection processes, and the size range of visible particulate matter may depend on the actual product or manufacturing process. Additionally, Nonconformance, Corrective Action/Preventative Action ("CAPA"), and Complaints may be surveyed to determine the types, sizes, and morphologies of particulate matter that are commonly found within the flexible container 102. By determining how particles or particulate matter is generated and where the particles have been found, it has been determined that empty container 102 fabrication is a probable cause of particles inside containers 102. Specifically, multiple failure modes and/or causes can occur at the container 102 during its fabrication step.

After determining the types and locations of particulate matter in empty flexible containers 102, systematic defect creation may be used to train an automated vision system. For example, empty containers 102 with the particle types identified above may be created and provided to suppliers to train automated vision systems configured to find and detect the particles. These created defective containers 102 (e.g., threshold containers) may be used to calibrate detector 120 and/or image processor 150. Further calibration may be achieved by providing threshold containers with all known process variation (e.g., batch size, batch date, part specification) to ensure minimization of false rejects.

Training the automated visual inspection system 100 may include adjusting the intensity or wavelength of light source 110, adjusting the exposure time for captured images, adjusting the backdrop 160 color, etc. Additionally, training may involve adjusting imaging parameters such as the quantity of images taken, focus and zoom settings of detector 120, etc. Training may also involve adjustments to image processing, such as averaging images, making difference images, or image thresholding. Further, training may involve preloading known defective container 102 images into a database, such as memory device 134, which are compared against real time image data of tested containers 102 by image processor 150. As additional defective containers 102 are identified, the database of defective container 102 images may be updated to continuously improve detection capabilities of visual inspection system 100. The image or images of the defective containers 102 may also be used in demonstrations, re-evaluation, or for other system improvements. After training the vision system, the result is an automated visual inspection system 100 composed of light transmission and camera detection in which images are interrogated to determine if a particle is present within empty flexible container 102.

The automated visual inspection system 100 may be used to detect particulate matter, such as opaque particles, within clear, small volume parenteral ("SVP") containers with no closures (e.g., injection sites). Additionally, detection may be improved and used with large volume parenterals ("LVPs"), and parenterals with surface finishes that may otherwise make detection of particulate matter difficult. Further, the automated visual inspection system 100 may advantageously improve detectability of particulate matter around the edges of a container 102 body, near port tubes, and inside injection sites.

Figure 2:
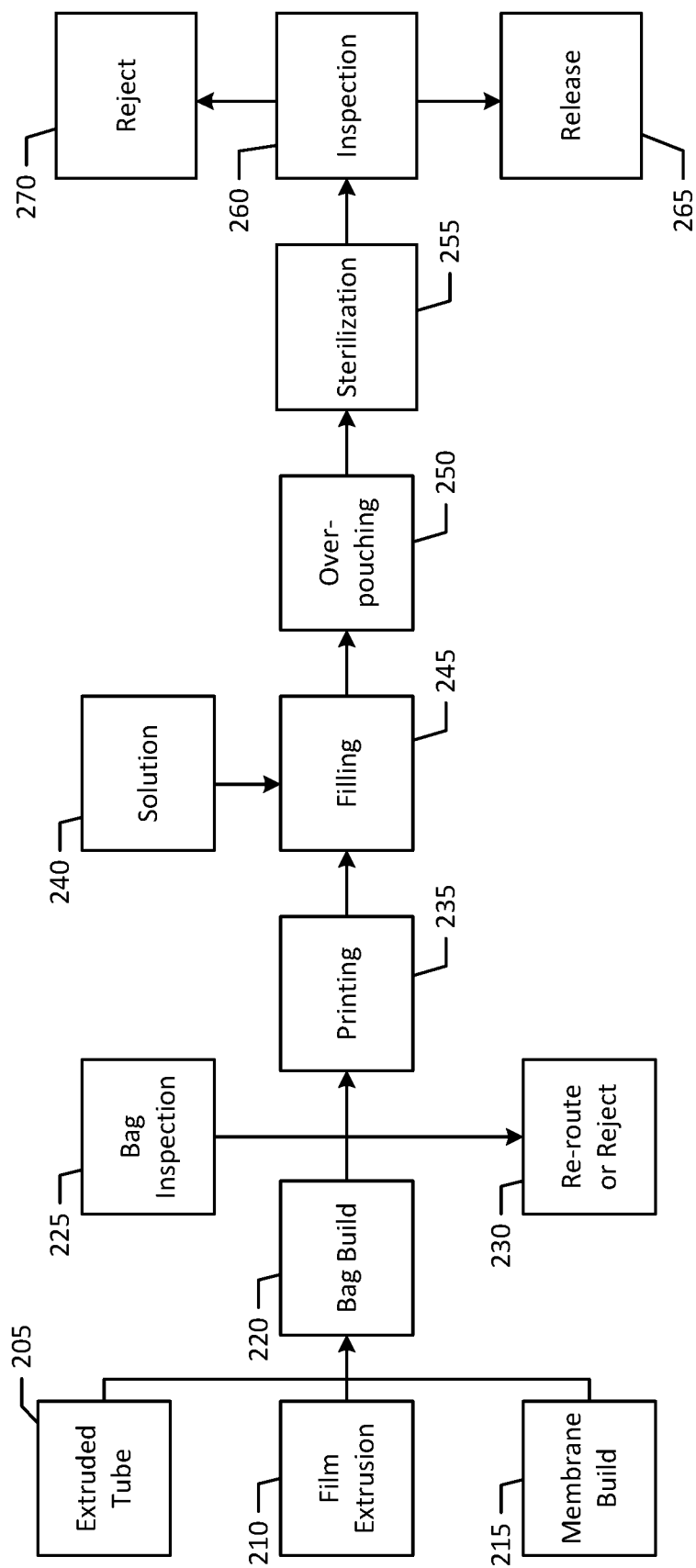
FIG. 2 is a schematic view of an automated container manufacturing and visual inspection system according to an example embodiment of the present disclosure.

FIG. 2 illustrates one example manufacturing and inspection process of containers 102 of the present disclosure. For example, at blocks 205, 210, and 215, various build techniques may be used such as tube extrusion (e.g., block 205), film extrusion (e.g., block 210), and membrane build (e.g., block 215) to build the container 102 or bag at block 220. Then, at block 225, container 102 (e.g., bag) is inspected by using automated visual inspection 100 in the illustrated embodiment. Alternatively, bag inspection may occur after labeling/printing (e.g., block 235), but before filling (e.g., block 245). If particulate matter is present, bag 102 may be re-routed or rejected at block 230. At block 235, bags 102 that have passed inspection are printed with label and/or barcode information. Bags 102 are then filled with solution at blocks 240 and 245. In an example, the solution may be sterile water for injection or a parenteral fluid for treatment.

Optionally, at block 250, an over-pouch may optionally be added to bag 102. The over-pouch is an outer bag that serves as a dust cover and/or moisture transmission barrier for the primary fluid container. Over-pouches limit moisture loss through the container wall of the primary container during extended storage periods. It is also contemplated to use system 100 to detect empty over-pouches prior to their application at block 250. Bags 102 are then sterilized (e.g., via gamma sterilization) at block 255. After sterilization, the bags 102 undergo final inspection at block 260. If the bags 102 pass inspection, they are released and packaged at block 265. If bags 102 fail inspection, they are rejected at block 270.

Referring now to FIGS. 3A and 3B, example containers 102a and 102b (referred to herein collectively as containers 102 or generally individually as container 102) are illustrated. Container 102 includes an interior 304 surrounded by a peripheral seal 306. FIG. 3A illustrates a container 102a without a defect (e.g., no particulate matter 320 is present in container interior 304). Conversely, FIG. 3B illustrates a container 102b with a defect (e.g., particulate matter 320 is present in container interior 304). In an example, light passing through Polyvinyl Chloride ("PVC") and flexible polypropylene, poly(ethylene-co-vinyl acetate) ("EVA") (e.g., container material) will largely be transmitted through the material, while light may be heavily attenuated or reflected off particulate matter 320 within container 102.

In an example, grayscale images are used to provide sufficient contrast between particulate matter and the flexible packaging materials, thereby enabling automated visual inspection system 100 to readily determine when a container 102 is defective (e.g., contains particulate matter 320).

In an example, background or backdrop 160 (as illustrated in FIG. 1) may have one or more pigments, shades or patterns. For example, background or backdrop 160 may include a white background 162, such as a non-glare white background. In another example, backdrop 160 may be a black background 164, such as a matte black background. Additionally, background or backdrop 160 may be a combination of a white background 162 and a black background 164. For example, detector 120 may take multiple images of container 102 against different backdrops 160 (e.g., rotating or visually changing from light to dark) to help improve detectability of particulate matter 320. Based on the background or backdrop 160 used, particulate matter 320 may appear visibly darker or light to detector 120. When using a lighter or white background 162, light is heavily attenuated by the particulate matter 320 with very little transmission to detector 120, while light is readily transmitted through the flexible container and reflected off the white background 162 where no particulate matter 320 is present. Conversely, when using a darker or black background 164, light may be reflected off the particulate matter 320 and transmitted back to detector 120, while light is readily transmitted through the flexible container and absorbed by the black background 164 where no particulate matter 320 is present. Image data from the detector 120 is sent to image processor 150, which uses the data to determine if particulate matter 320 is present, as discussed in more detail below. In many cases, however, no backdrop 160 is required.

Figure 4:
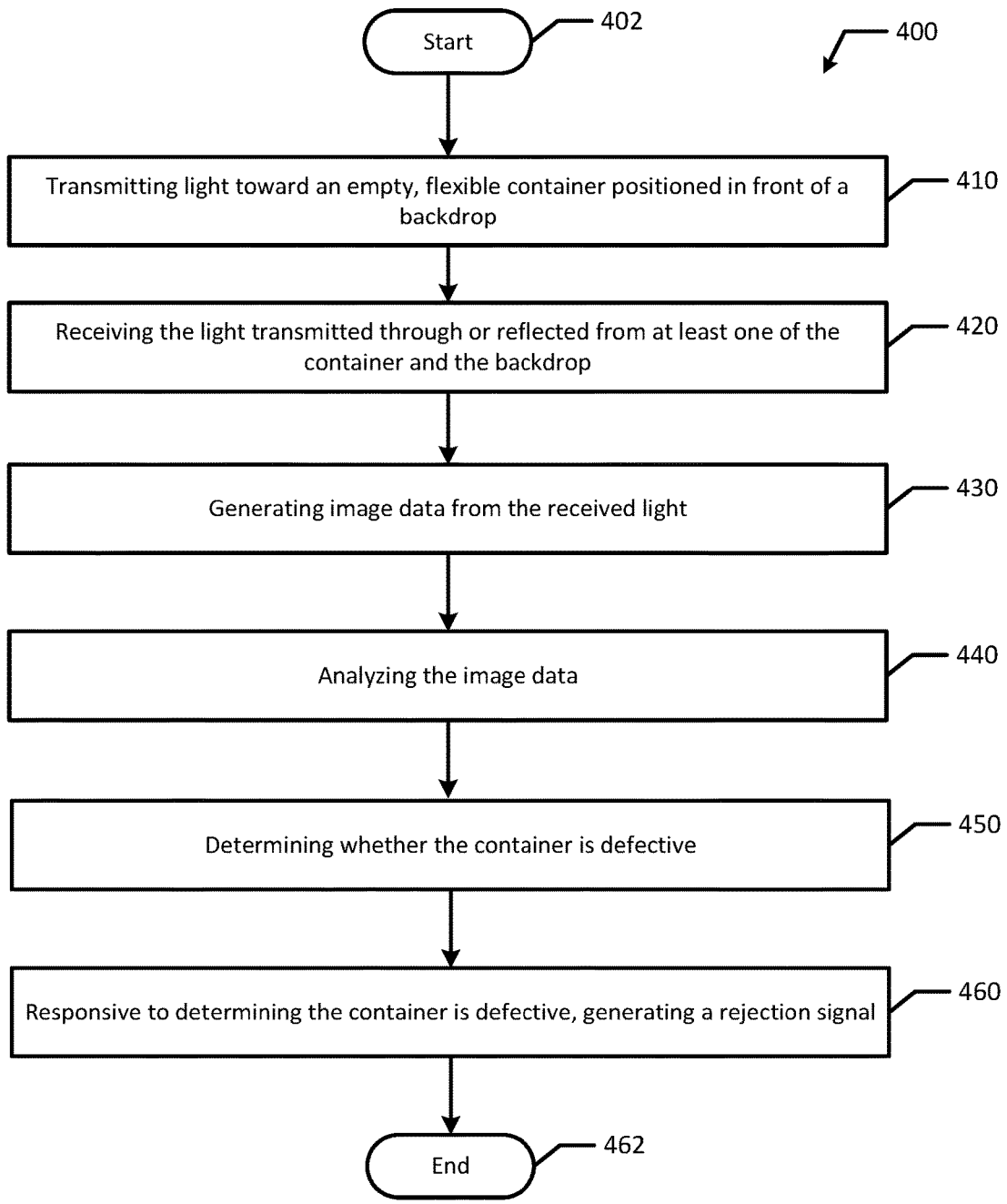
FIG. 4 is a flow chart of an example process for detecting particulate matter in an empty, flexible container according to an example embodiment of the present disclosure.

FIG. 4 illustrates a flowchart of an example method 400 for use with system 100 and for detecting particulate matter in an empty, flexible container in accordance with an example embodiment of the present disclosure. The flowchart of FIG. 4 may be implemented at control unit 130. Although the example method 400 is described with reference to the flowchart illustrated in FIG. 4, it should be appreciated that methods performing the acts associated with the method 400 may be varied. For example, the order of some of the blocks may be changed, certain blocks may be combined with other blocks, and some of the blocks described may be optional. Method 400 may be performed by processing logic that may include hardware (circuitry, dedicated logic, etc.), software, or a combination of both.

At oval 402, method 400 begins. At block 410, example method 400 transmits light towards an empty, flexible container 102 positioned in front of any backdrop 160 described herein. In an example embodiment, the light source 110 may emit light at a predetermined wavelength. In another example embodiment, filters may be used with light source 110 to tune the light source 110 to the appropriate wavelength. As discussed above, backdrop 160 may be white (e.g., non-glare white), black (e.g., matte black), a combination of both, or employ one or more other colors. For example, the container 102 may be positioned in front of a white backdrop 162 (FIG. 1) and then passed in front of a black backdrop 164 (FIG. 1) to provide different image data. A white backdrop 162 may be beneficial for certain types of particulate matter 320, while a black backdrop 164 may improve detectability of other types of particulate matter 320. At block 420, example method 400 receives light transmitted through or reflected from at least one of the container 102 and backdrop 160. For example, detector 120 may receive light transmitted through container 102 after reflecting off backdrop 160 where it is re-transmitted back through container 102. In another example, detector 120 may receive light reflected from particulate matter 320, while the remaining light is transmitted through container 102 and absorbed by backdrop 160 when a darker backdrop 160 is used, such as a black backdrop 164.

At block 430, example method 400 generates image data from the received light. Detector 120 may generate image data for the entire container 102. In an example, multiple images of the same container 102 may be taken by detector 120. Additionally container 102 may be agitated, rotated, or moved to provide different images for analysis. In another example embodiment, detector 120 may generate enhanced or multiple image data for one or more regions of interest for container 102.

At block 440, example method 400 analyzes the image data. In an example, image processor 150 may analyze image data according to the backdrop 160 used. In an example, image data may be obtained after taking a "difference image" or by subtracting an image from an expected image. For example, a "difference image" may be an image of the inspected container 102 against a black backdrop 164 subtracted from a control image. The control image may be an image of a container 102 free of particulate matter 320 against the black backdrop 164. Similarly, a difference image may be made from image data received using a white backdrop 162. In another example, image data may be adjusted to different contrasts or color scales to accentuate the presence of particulate matter 320. Additionally, pixel information from the image data may be averaged between multiple images when analyzing the image data.

Analyzing the image data may also include boundary detection and individual pixel thresholding in order to distinguish and separate particulate matter 320 from expected empty, flexible container 102 features. In an example, boundary detection may be accomplished by using physical container dimensions, container specifications, container tolerances, or a combination thereof to determine and detect wherein boundaries (e.g., container seals, port tube edges, etc.) exist for each empty, flexible container 102. Within the boundaries, pixel intensity values may be measured against neighboring values. For example, groups of pixels that are different than surrounding pixels (e.g., pixel intensity values of the group of pixels are different than the pixel intensity values of the surrounding pixels) may be identified as a potential defect or point of interest. If the potential defect meets specific inspection criteria (which may be adjusted as noted above via setting or adjusting parameters) based on threshold size of particulate matter 320, region of interest, container type, container geometry and variability, etc., then the empty, flexible container 102 may be rejected. Once a container 102 is rejected, the respective image or images of the defective container may be stamped with various informative features such as time, model of detector 120 or camera 122, container version, container batch, etc. As discussed above, the image or images may be used in demonstration, re-evaluation, or for improving the automated visual inspection system 100 by using the images for training purposes.

In an example, image analysis may be repeated. The same image data may be analyzed again or new image data may be acquired for the repeat analysis. For example, pattern 104 of empty, flexible containers 102 may be rescanned to repeat the analysis. During a repeat analysis, user interface 180 may display the original analysis results along with the repeat analysis of the new images and/or saved images.

At block 450, example method 400 determines whether the container 102 is defective. For example, image processor 150 may determine a container 102 is defective based on the compared image data described above. At block 460, responsive to determining that the container 102 is defective, example method 400 generates a rejection signal. Image processor 150 may generate a rejection signal that is passed from control unit 130 to reject station 170, which in turn causes defective container 102 to be discarded into a rejection bin or diverted to another processing line. If container 102 is found not be defective at block 450, it is passed along the conveyor system 140 as described above. At oval 462, method 400 ends.

In another example, example method 400 may be performed without a backdrop 160. For example, at block 410, light may be transmitted toward an empty, flexible container 102. Similarly, at block 420, light may be received that is transmitted through or around the empty, flexible container 102. It should be appreciated that analyzing the image data at block 440 may employ any of the image analysis techniques disclosed herein.

Aspects of the subject matter described herein may be useful alone or in combination with any one or more of the other aspects described herein. Without limiting the foregoing description, in an exemplary aspect of the present disclosure, an automated visual inspection system for detecting the presence of particulate matter in an empty, flexible container includes a light source, a detector, and an image processor. The light source is configured to transmit light and the detector is configured to receive the light and generate image data. Additionally, the system may include a backdrop and a conveyor system to transport the container along a path that passes between the detector and the backdrop, so that light passes through the container and impinges on the backdrop. The image processor is configured to analyze the image data, determine whether the container is defective, and generate a rejection signal if the container is defective.

In accordance with another exemplary aspect of the present disclosure, which may be used in combination with the preceding aspect, the system further includes a backdrop.

In accordance with another exemplary aspect of the present disclosure, which may be used in combination with any one or more of the preceding aspects, the system further includes and a conveyor system configured to transport the at least one empty, flexible container along a path. The path passes between the detector and the backdrop, so that light passes through the at least one empty, flexible container and impinges on the backdrop.

In accordance with another exemplary aspect of the present disclosure, which may be used in combination with any one or more of the preceding aspects, the backdrop is configured to absorb the light transmitted through the at least one empty, flexible container.

In accordance with another exemplary aspect of the present disclosure, which may be used in combination with any one or more of the preceding aspects, the backdrop includes a first portion having a first color and a second portion having a second color.

In accordance with another exemplary aspect of the present disclosure, which may be used in combination with any one or more of the preceding aspects, the detector is positioned on the same side of the conveyor system as the light source.

In accordance with another exemplary aspect of the present disclosure, which may be used in combination with any one or more of the preceding aspects, the detector is positioned on the opposite side of the conveyor system as the light source.

In accordance with another exemplary aspect of the present disclosure, which may be used in combination with any one or more of the preceding aspects, the detector is configured to generate first image data based on the first color. Additionally, the detector is configured to generate second image data based on the second color.

In accordance with another exemplary aspect of the present disclosure, which may be used in combination with any one or more of the preceding aspects, the system further includes a filter for the light source, the filter configured to block a predetermined wavelength of light such that the light source accentuates the presence of the particulate matter.

In accordance with another exemplary aspect of the present disclosure, which may be used in combination with any one or more of the preceding aspects, the inspection takes place before the at least one empty, flexible container is printed or filled.

In accordance with another exemplary aspect of the present disclosure, which may be used in combination with any one or more of the preceding aspects, the light source emits light at a predetermined wavelength.

In accordance with another exemplary aspect of the present disclosure, which may be used in combination with any one or more of the preceding aspects, the light source includes at least one filter, and the at least one filter is configured to tune the light source to emit light at the predetermined wavelength.

In accordance with another exemplary aspect of the present disclosure, which may be used in combination with any one or more of the preceding aspects, the detector is configured to generate image data for one or more region of interest of the at least one empty, flexible container.

In accordance with another exemplary aspect of the present disclosure, which may be used in combination with any one or more of the preceding aspects, the detector is an array detector.

In accordance with another exemplary aspect of the present disclosure, which may be used in combination with any one or more of the preceding aspects, the array detector is any one of a focal plane array camera, a charged-coupled array detector, a complimentary metal-oxide-semiconductor array detector, a photodiode array camera, and a spectrometer having a two-dimensional array detector.

In accordance with another exemplary aspect of the present disclosure, which may be used in combination with any one or more of the preceding aspects, the detector is a first detector, and the system further includes a second detector.

In accordance with another exemplary aspect of the present disclosure, which may be used in combination with any one or more of the preceding aspects, the first detector is configured to receive light in a first light spectrum and the second detector is configured to receive light in a second light spectrum.

In accordance with another exemplary aspect of the present disclosure, which may be used in combination with any one or more of the preceding aspects, the first detector is positioned to capture first images of the at least one container against a backdrop. Additionally, the second detector is positioned to capture second images of the light passing through the at least one container before the light reaches the backdrop.

In accordance with another exemplary aspect of the present disclosure, which may be used in combination with any one or more of the preceding aspects, the first detector is configured to capture first image data of a first portion of the at least one empty, flexible container. Additionally, the second detector is configured to capture second image data of a second portion of the at least one empty, flexible container.

In accordance with another exemplary aspect of the present disclosure, which may be used in combination with any one or more of the preceding aspects, the at least one container is made from at least one of polyvinylchloride, flexible polypropylene, and poly(ethylene-co-vinyl acetate).

In accordance with another exemplary aspect of the present disclosure, which may be used in combination with any one or more of the preceding aspects, the system further includes a first backdrop having a first color, pigment, shade, or pattern; and a second backdrop having a second color, pigment, shade, or pattern.

In accordance with another exemplary aspect of the present disclosure, which may be used in combination with any one or more of the preceding aspects, the detector is configured to receive the light and generate image data from the at least one container positioned in front of both the first backdrop and the second backdrop.

In accordance with another exemplary aspect of the present disclosure, which may be used in combination with any one or more of the preceding aspects, the image data includes first image data with the at least one container in front of the first backdrop. Additionally, the image data includes second image data with the at least one container in front of the second backdrop.

In accordance with another exemplary aspect of the present disclosure, which may be used in combination with any one or more of the preceding aspects, the system further includes a diffusor positioned between the light source and the detector.

In accordance with another exemplary aspect of the present disclosure, which may be used in combination with any one or more of the preceding aspects, a method includes transmitting, by a light source, light towards an empty, flexible container positioned in front of a backdrop. The method also includes receiving, by a detector, the light transmitted through or reflected from at least one of the empty, flexible container and the backdrop. Additionally, the method includes generating, by the detector, image data from the light received by the detector and analyzing, by an image processor, the image data. Furthermore, the method includes determining, by the image processor, whether the empty, flexible container is defective.

In accordance with another exemplary aspect of the present disclosure, which may be used in combination with any one or more of the preceding aspects, the backdrop includes a first portion having a first color and a second portion having a second color. Additionally, generating image data includes generating first image data based on the first color and generating second image data based on the second color.

In accordance with another exemplary aspect of the present disclosure, which may be used in combination with any one or more of the preceding aspects, receiving the light by the detector includes receiving the light transmitted through the container after reflecting off the backdrop and re-transmitting through the empty, flexible container.

In accordance with another exemplary aspect of the present disclosure, which may be used in combination with any one or more of the preceding aspects, the detector receives a first portion of the light reflected from particulate matter while a second portion of the light is transmitted through the empty, flexible container and absorbed by the backdrop.

In accordance with another exemplary aspect of the present disclosure, which may be used in combination with any one or more of the preceding aspects, the method further includes agitating the empty, flexible container while positioned in front of the backdrop. Additionally, agitating includes at least one of rotating and moving the empty, flexible container.

In accordance with another exemplary aspect of the present disclosure, which may be used in combination with any one or more of the preceding aspects, generating image data includes generating image data for one or more regions of interest for the empty, flexible container.

In accordance with another exemplary aspect of the present disclosure, which may be used in combination with any one or more of the preceding aspects, the detector generates the image data via a difference image between separate images.

In accordance with another exemplary aspect of the present disclosure, which may be used in combination with any one or more of the preceding aspects, the separate images include a first image of an inspected empty, flexible container against the backdrop subtracted from a control image. The control image is a second image of a control container against the backdrop.

In accordance with another exemplary aspect of the present disclosure, which may be used in combination with any one or more of the preceding aspects, analyzing the image data includes averaging pixel information from multiple images generated from the empty, flexible container.

In accordance with another exemplary aspect of the present disclosure, which may be used in combination with any one or more of the preceding aspects, the method further includes training the image processor based on threshold image data from at least one threshold container created with at least one systematic defect.

In accordance with another exemplary aspect of the present disclosure, which may be used in combination with any one or more of the preceding aspects, training the image processor includes at least one of averaging images, making difference images, and image thresholding based on at least one of the image data or the threshold image data.

In accordance with another exemplary aspect of the present disclosure, which may be used in combination with any one or more of the preceding aspects, training the image processor includes preloading known defective container images into a database.

In accordance with another exemplary aspect of the present disclosure, which may be used in combination with any one or more of the preceding aspects, analyzing the image data by the image processor includes comparing the image data to the known defective container images.

In accordance with another exemplary aspect of the present disclosure, which may be used in combination with any one or more of the preceding aspects, the method further includes, responsive to determining that the empty, flexible container is defective, loading the image data of the defective container into the database.

In accordance with another exemplary aspect of the present disclosure, which may be used in combination with any one or more of the preceding aspects, the method further includes calibrating the detector using at least one threshold container created with at least one systematic defect.

In accordance with another exemplary aspect of the present disclosure, which may be used in combination with any one or more of the preceding aspects, a method includes transmitting, by a light source, light towards an empty, flexible container. The method also includes receiving, by a detector, at least one of the light transmitted through or around the empty, flexible container and generating, by the detector, image data from the light received by the detector. Additionally, the method includes analyzing, by an image processor, the image data and determining, by the image processor, whether the empty, flexible container is defective.

In accordance with another exemplary aspect of the present disclosure, which may be used in combination with any one or more of the preceding aspects, generating image data includes generating image data for one or more regions of interest for the empty, flexible container.

In accordance with another exemplary aspect of the present disclosure, which may be used in combination with any one or more of the preceding aspects, the detector generates the image data via a difference image between separate images.

In accordance with another exemplary aspect of the present disclosure, which may be used in combination with any one or more of the preceding aspects, the separate images include a first image of an inspected empty, flexible container subtracted from a control image. The control image is a second image of a control container.

In accordance with another exemplary aspect of the present disclosure, which may be used in combination with any one or more of the preceding aspects, the detector is a first detector and the image data is first image data. Additionally, the method further includes receiving, by a second detector, at least one of the light transmitted through or around the empty, flexible container. The method also includes generating, by the second detector, second image data from the light received by the second detector. Furthermore, the method includes analyzing, by the image processor, the second image data.

In accordance with another exemplary aspect of the present disclosure, which may be used in combination with any one or more of the preceding aspects, the first detector generates first image data for a first portion of the empty, flexible container. The second detector generates second image data for a second portion of the empty, flexible container.

In accordance with another exemplary aspect of the present disclosure, which may be used in combination with any one or more of the preceding aspects, analyzing the image data includes averaging pixel information from multiple images generated from the empty, flexible container.

In accordance with another exemplary aspect of the present disclosure, which may be used in combination with any one or more of the preceding aspects, the method further includes training the image processor based on threshold image data from at least one threshold container created with at least one systematic defect.

In accordance with another exemplary aspect of the present disclosure, which may be used in combination with any one or more of the preceding aspects, training the image processor includes at least one of averaging images, making difference images, and image thresholding based on at least one of the image data or the threshold image data.

In accordance with another exemplary aspect of the present disclosure, which may be used in combination with any one or more of the preceding aspects, training the image processor includes preloading known defective container images into a database.

In accordance with another exemplary aspect of the present disclosure, which may be used in combination with any one or more of the preceding aspects, analyzing the image data by the image processor includes comparing the image data to the known defective container images.

In accordance with another exemplary aspect of the present disclosure, which may be used in combination with any one or more of the preceding aspects, the method further includes responsive to determining that the empty, flexible container is defective, loading the image data of the defective container into the database.

In accordance with another exemplary aspect of the present disclosure, which may be used in combination with any one or more of the preceding aspects, the method further includes calibrating the detector using at least one threshold container created with at least one systematic defect.

In accordance with another exemplary aspect of the present disclosure, which may be used in combination with any one or more of the preceding aspects, the method further includes adjusting an inspection parameter of at least one of the detector and the image processor.

In accordance with another exemplary aspect of the present disclosure, which may be used in combination with any one or more of the preceding aspects, analyzing the image data by the image processor includes analyzing the image data according to an inspection parameter.

In accordance with another exemplary aspect of the present disclosure, which may be used in combination with any one or more of the preceding aspects, the inspection parameter is at least partially based on at least one of a threshold particle size and a container geometry.

In accordance with another exemplary aspect of the present disclosure, which may be used in combination with any one or more of the preceding aspects, analyzing the image data by the image processor includes detecting at least one boundary of the empty, flexible container.

In accordance with another exemplary aspect of the present disclosure, which may be used in combination with any one or more of the preceding aspects, analyzing the image data by the image processor includes determining a pixel intensity value of at least one pixel of the image data.

In accordance with another exemplary aspect of the present disclosure, which may be used in combination with any one or more of the preceding aspects, analyzing the image data by the image processor includes determining a pixel intensity value of a group of pixels and comparing the pixel intensity value to at least one neighboring pixel intensity value.

In accordance with another exemplary aspect of the present disclosure, which may be used in combination with any one or more of the preceding aspects, a method includes transmitting light towards an empty, flexible container; receiving the light transmitted through the empty, flexible container and/or reflected from the backdrop; generating image data from the light received; analyzing the image data; and determining whether the empty, flexible container is defective.

In accordance with another exemplary aspect of the present disclosure, which may be used in combination with any one or more of the preceding aspects, a method includes transmitting light towards an empty, flexible container; receiving the light transmitted through and/or around the empty, flexible container; generating image data from the light received; analyzing the image data; and determining whether the empty, flexible container is defective.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention is claimed as follows:

1. An automated visual inspection system for detecting the presence of particulate matter, comprising:
   a backdrop including a first side with a first portion and a second portion, the first portion of the first side having a first color and the second portion of the first side having a second color;
   at least one empty, flexible container;
   a light source configured to transmit light through the at least one empty, flexible container thereby impinging on the backdrop;
   a detector configured to receive the light and generate image data; and
   an image processor configured to:
      analyze the image data,
      determine whether the at least one empty, flexible container is defective, and
      generate a rejection signal if the at least one empty, flexible container is defective.

2. The system according to claim 1, further comprising:
   a conveyor system configured to transport the at least one empty, flexible container along a path, wherein the path passes between the detector and the backdrop, so that light passes through the at least one empty, flexible container and impinges on the backdrop.

3. The system according to claim 1, wherein the detector is configured to generate first image data based on the first color, and wherein the detector is configured to generate second image data based on the second color.

4. The system according to claim 1, wherein the inspection takes place before the at least one empty, flexible container is printed.

5. The system according to claim 1, wherein the detector is configured to generate image data for one or more region of interest of the at least one empty, flexible container.

6. The system according to claim 1, wherein the detector is an array detector, and wherein the array detector is any one of a focal plane array camera, a charged-coupled array detector, a complimentary metal-oxide-semiconductor array detector, a photodiode array camera, and a spectrometer having a two-dimensional array detector.

7. The system according to claim 1, wherein the detector is a first detector, and which includes a second detector, and wherein the first detector is configured to capture first image data of a first portion of the at least one empty, flexible container, and wherein the second detector is configured to capture second image data of a second portion of the at least one empty, flexible container.

8. The system according to claim 1, further comprising:
a diffusor positioned between the light source and the detector.

9. A method comprising:
transmitting, by a light source, light towards an empty, flexible container and a backdrop;
receiving, by a detector, the light transmitted through the empty, flexible container and reflected from the backdrop, wherein the backdrop includes a first side with a first portion and a second portion, the first portion of the first side having a first color and the second portion of the first side having a second color;
generating, by the detector, image data from the light received by the detector;
analyzing, by an image processor, the image data; and
determining, by the image processor, whether the empty, flexible container is defective.

10. The method according to claim 9, wherein generating image data includes generating image data for one or more regions of interest for the empty, flexible container.

11. The method according to claim 9, wherein the detector generates the image data via a difference image between separate images, and wherein the separate images include a first image of an inspected empty, flexible container subtracted from a control image, wherein the control image is a second image of a control container free of particulate matter.

12. The method according to claim 9, wherein the detector is a first detector and the image data is first image data, and wherein the method further comprises:
receiving, by a second detector, at least one of the light transmitted through or around the empty, flexible container;
generating, by the second detector, second image data from the light received by the second detector; and
analyzing, by the image processor, the second image data.

13. The method of claim 12, wherein the first detector generates first image data for a first portion of the empty, flexible container, and wherein the second detector generates second image data for a second portion of the empty, flexible container.

14. The method according to claim 9, wherein analyzing the image data includes at least one of (i) averaging pixel information from multiple images generated from the empty, flexible container, (ii) comparing the image data to the known defective container images, (iii) analyzing the image data according to an inspection parameter, (iv) detecting at least one boundary of the empty, flexible container, (v) determining a pixel intensity value of at least one pixel of the image data, and (vi) determining a pixel intensity value of a group of pixels and comparing the pixel intensity value to at least one neighboring pixel intensity value.

15. The method according to claim 9, further comprising:
training the image processor based on threshold image data from at least one threshold container created with at least one systematic defect.

16. The method according to claim 15, wherein training the image processor includes at least one of averaging images, making difference images, image thresholding based on at least one of the image data or the threshold image data, and preloading known defective container images into a database.

17. The method according to claim 9, further comprising:
responsive to determining that the empty, flexible container is defective, loading the image data of the defective container into the database.

18. The method according to claim 9, further comprising:
adjusting an inspection parameter of at least one of the detector and the image processor, wherein the inspection parameter is at least partially based on at least one of a threshold particle size and a container geometry.

* * * * *